United States Patent [19]

Munk et al.

[11] 4,214,861

[45] Jul. 29, 1980

[54] METHOD OF AND AN APPARATUS FOR MAKING PREFORMS FROM A POURABLE SUBSTANCE

[75] Inventors: Edmund Munk; Hermann Henke, both of Oberstenfeld, Fed. Rep. of Germany

[73] Assignee: Werzalit-Pressholzwerk J.F. Werz Jr. KG, Oberstenfeld, Fed. Rep. of Germany

[21] Appl. No.: 904,561

[22] Filed: May 10, 1978

Related U.S. Application Data

[62] Division of Ser. No. 790,615, Apr. 25, 1977, abandoned.

[30] Foreign Application Priority Data

| | | | |
|---|---|---|---|
| Apr. 28, 1976 | [DE] | Fed. Rep. of Germany | 2618599 |
| May 15, 1976 | [DE] | Fed. Rep. of Germany | 2621717 |
| Mar. 4, 1977 | [DE] | Fed. Rep. of Germany | 2709467 |

[51] Int. Cl.[2] ........ B29J 5/02

[52] U.S. Cl. ........ 425/199; 425/197; 425/449

[58] Field of Search ........ 264/69, 71, 67; 425/197, 199, 449

[56] References Cited

U.S. PATENT DOCUMENTS

| | | | |
|---|---|---|---|
| 1,177,854 | 4/1916 | Garfield | 425/197 |
| 1,990,634 | 2/1935 | Brown | 425/197 X |
| 2,689,597 | 9/1954 | Kinnear | 264/71 X |
| 2,696,330 | 12/1954 | Fahrni | 425/197 X |
| 3,171,872 | 3/1965 | Jarrett | 425/197 X |
| 3,648,649 | 3/1972 | Wasserman | 425/197 X |
| 3,697,208 | 10/1972 | Munk | 425/197 X |

*Primary Examiner*—Thomas P. Pavelko
*Attorney, Agent, or Firm*—Michael J. Striker

[57] ABSTRACT

A pourable substance is introduced into a container having a perforated bottom which defines, together with a mold, forming space which is to be filled with the pourable substance. The forming space has a configuration substantially corresponding to that of the preform to be made, and the pourable substance passes through the perforations of the bottom of the container and is distributed throughout the forming space, owing to vibrations to which the perforated bottom of the container, either alone or together with the container, is subjected. The pourable substance is compacted within the forming space due to the vibration of the perforated bottom so that the preform can be subsequently taken out of the mold and compressed elsewhere into a profiled article, or the profiled article can be produced from the preform directly in the mold. The bottom wall may have projections or recesses, and the wall portions bounding such projections or recesses may be solid walls, at least those surfaces which are inclined relative to the plane of vibration of the bottom. The bottom may include two juxtaposed bottom members each having a different perforation spacing and each conducting an independent vibratory movement relative to the other bottom member. The speeds of vibration of the two bottom members may be different, and so may be the vibratory trajectories thereof.

22 Claims, 15 Drawing Figures

FIG. 1
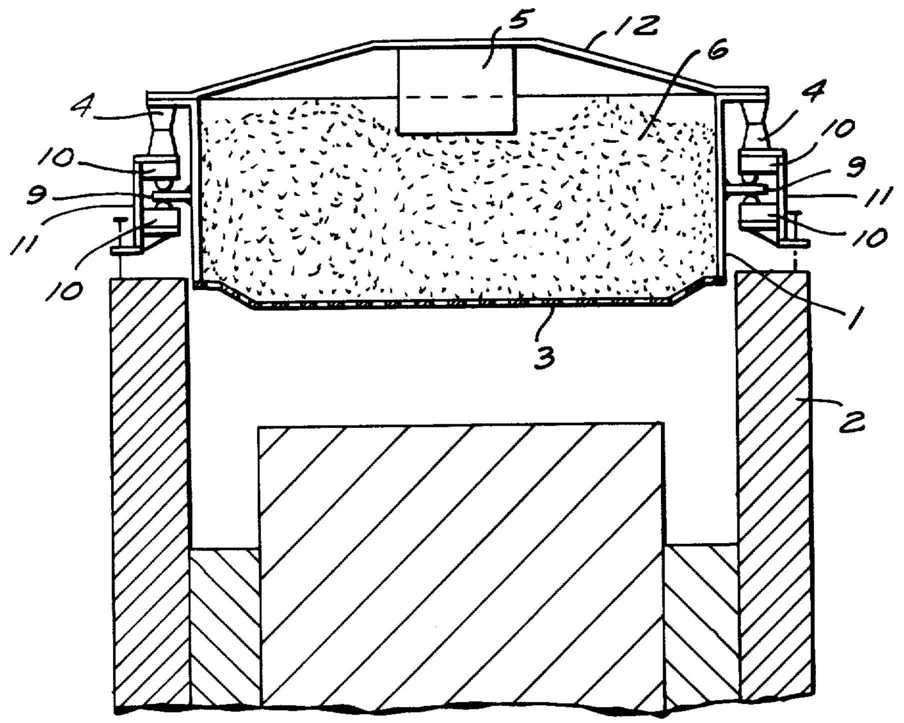
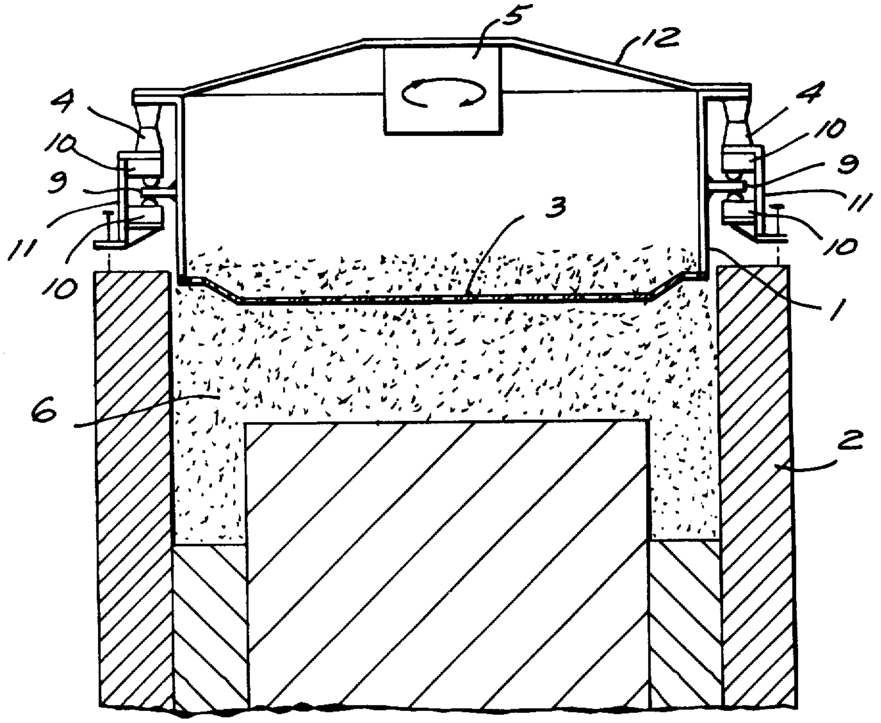
FIG. 2

FIG. 3
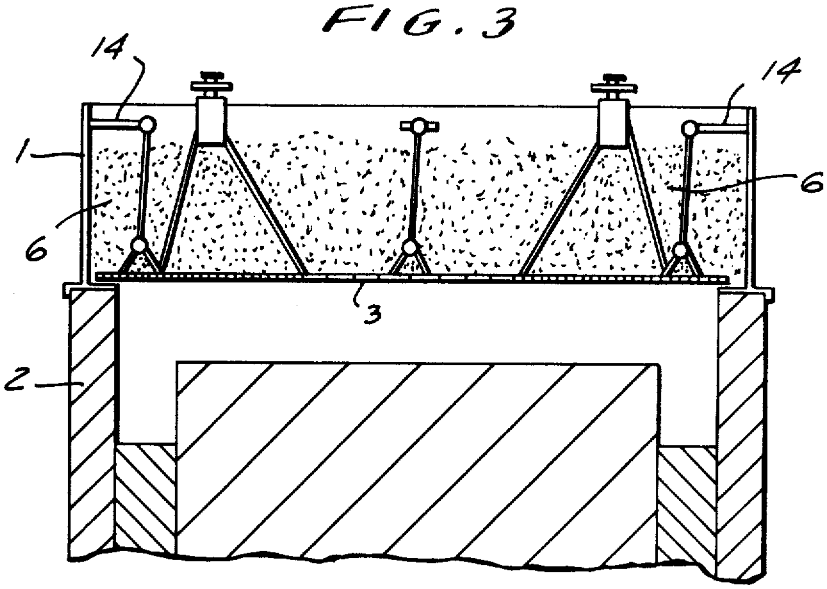
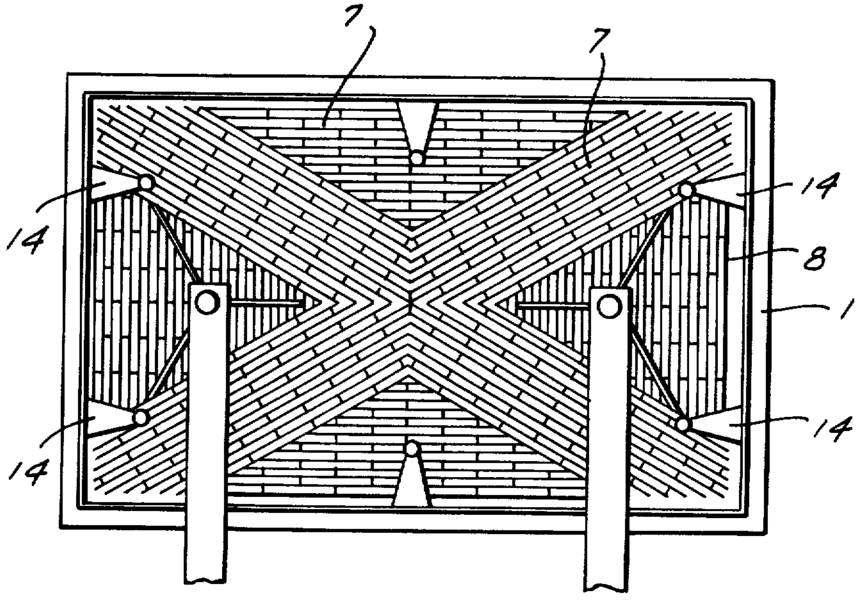
FIG. 4

FIG. 7a
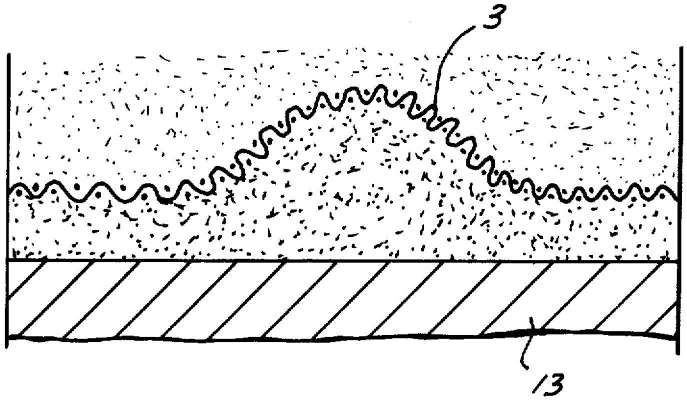
FIG. 7b
FIG. 8a
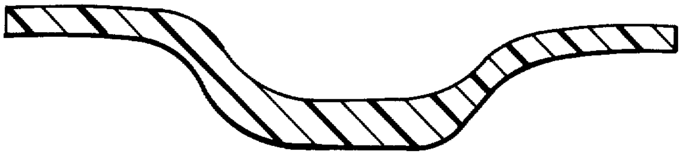
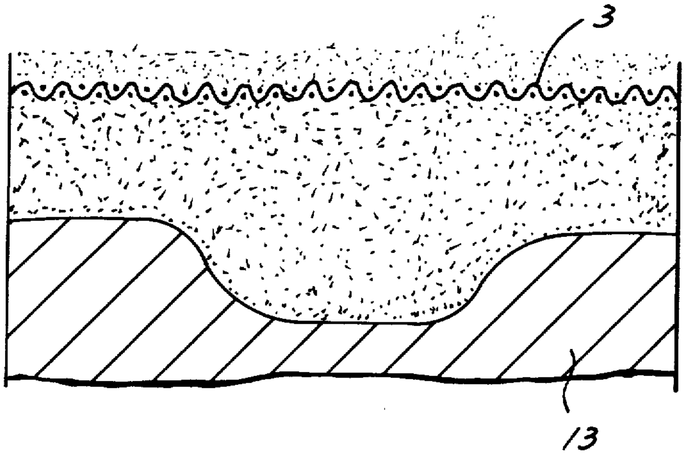
FIG. 8b

METHOD OF AND AN APPARATUS FOR MAKING PREFORMS FROM A POURABLE SUBSTANCE

This is a division of application Ser. No. 790,615, filed Apr. 15, 1977 now abandoned.

BACKGROUND OF THE INVENTION

The present invention relates to a method of and an apparatus for making preforms from a pourable but at most limitedly flowable substance for subsequent use in producing three-dimensional profiled articles, particularly for use in connection with a substance which is a mixture of fillers and binders.

There have already been proposed many methods of and apparatuses for producing three-dimensionally profiled articles, such as table tops, windows, pellets and similar objects, among them such in which a mixture of chip-shaped or filamentary materials with a binder, such as a mixture of comminuted, cellulose-containing particles with a binder which hardens at an elevated temperature, that is, a thermosetting synthetic plastic material, is filled into a lower mold part of a compression mold in such a manner that the substance or mixture assumes a shape on the lower mold part which corresponds, in a certain proportion, either to the final shape of the article to be produced, or to the density to be achieved throughout or in selected regions of the article. Usually, the thickness of the layer of the mixture in the compression mold amounts to 4 to 7 times the thickness of the finished profiled article at the particular region thereof. When the compression mold is a pre-compression mold, then the mixture filled into the lower mold part of the mold is pre-compressed in the latter by a compressing mold or tool, and the mixture is compacted to almost its final density. The strength of the thus made preform is sufficient for preventing deformation or disintegration thereof during the withdrawal thereof from the pre-compressing mold or tool arrangement. After that, the preform is inserted into a hot compressing mold, possibly after or simultaneously with coating with a protective or decorative layer, and the preform obtains its final shape in the hot compressing mold, under the influence of pressure and elevated temperature, and the thus-obtained article hardens and, possibly, is simultaneously provided with a decorative or protective layer. On the other hand, the above-mentioned mold which is being filled with the mixture may be a hot compressing mold in which the article is directly produced without the intermediary of the preform.

The quality of the pressed profiled article depends on the fact whether or not it possesses, throughout, the density and/or fibrous structure which are necessary for the achievement of the desired mechanical properties. These properties are, to a great extent, dependent on the fact what degree of care has been exercised during the filling of the mixture into the lower mold. Heretofore, the filling has been accomplished, during the production of profiled articles of non-excessive dimensions, in such a manner that a predetermined and metered amount of the mixture has been admitted to the lower mold either out of a measuring container or, by means of an automatic metering arrangement, from a storage container, after which such a predetermined metered amount has been manually distributed over the lower mold either uniformly, or non-uniformly, dependent on the particular requirements. It will be appreciated that, when the metered amount of the mixture is distributed in this manner, the desired properties throughout the article are very rarely, if ever, achieved and, many a time, such properties are left, to a large degree, to chance.

SUMMARY OF THE INVENTION

Accordingly, it is a general object of the present invention to avoid the above-mentioned disadvantages.

More particularly, it is an object of the present invention to devise a method of filling molds which is not possessed of the above-mentioned disadvantages of the prior art methods.

Still more particularly, it is an object of the present invention to devise a method which rapidly, reliably and automatically accomplishes the desired filling of the mold.

A concomitant object of the present invention is to design an apparatus which is capable of performing the above-mentioned method.

A further object of the present invention is to so construct such apparatus as to be simple in construction, reliable in operation and inexpensive to manufacture.

A yet another object of the present invention is to so construct an apparatus as to permit the automation of the filling procedure.

In pursuance of these objects and others which will become apparent hereafter, one feature of the present invention resides, briefly stated, in a method of making preforms from a pourable but at most limitedly flowable substance for subsequent use in producing three-dimensionally profiled articles, which comprises the steps of defining a forming space of a configuration substantially corresponding to that of a preform to be made, between a perforated bottom element of a container element, and a mold element; and distributing the substance throughout such forming space, including admitting the substance to said forming space, and vibrating at least one of said elements. Preferably, the admitting of the substance includes placing the substance into a filling space bounded by said container and bottom elements. Then the vibrating step includes imparting vibratory movement to at least one of the bottom and container elements to pass the substance from said filling into said forming space through the perforations of said bottom element.

The present inventive method is to be, to advantage, used in producing preforms for articles of uniform wall thickness despite the fact that the articles have a strongly profiled configuration and include, in particular, steep wall portions. Under such circumstances, the vibrating may include imparting vibratory movement to said bottom element substantially along a horizontal plane to compact the substance in the forming space. The preform which is being made, under these circumstances, will have surfaces parallel to, and also surfaces inclined relative to, the horizontal plane. Then, the imparting step may be so performed that the substance of the preform is preferentially compacted in the regions of the inclined surfaces.

The method according to the present invention can be used, to a great advantage, in the production of pellets in one piece from the above-mentioned materials.

It was heretofore impossible, or possible only with great difficulties and by resorting to special finishing procedures, to manufacture such pellets produced as profiled bodies, in which the cup-shaped legs of the pellets would have a uniform wall thickness, particularly inasmuch as no layer of uniform thickness could be built in the region of the pellet leg lateral walls which have a large slope, from the substance here under consideration, and it was very difficult if not impossible to maintain such uniform wall thickness in such region, whenever obtained, until the pressing of the final article or pellet. Rather, as to the wall thickness of the conventional pellets which have been heretofore manufactured by the above-mentioned procedure, the wall thickness of the pellet leg increases, starting from the surface of the pellet, to the support or rest surface of the pellet leg. Even disregarding the excessive material expenditure and increase of weight caused by this situation, it is to be mentioned that the pellet leg is reinforced at such places where it already possesses a sufficient strength.

The method of the present invention and the associated equipment which will be presently discussed in more detail, are capable of producing even such articles, and of giving them uniform wall thickness.

In addition thereto, it is a further concept of the present invention to provide an apparatus for performing the above-discussed method, which is capable of achieving the desired properties of the preform or even of the final article.

Thus, another facet of the present invention resides in an apparatus for making preforms from a pourable but at most limitedly flowable substance for subsequent use in producing three-dimensional articles, which apparatus comprises means for defining a forming space of a configuration substantially corresponding to that of a preform to be made, including a perforated bottom element of a container element, and a mold element; and means for distributing the substance throughout said forming space, including means for admitting the substance to said forming space, and means for vibrating at least one of said elements. The container and bottom elements bound a filling space with one another, and the admitting means then includes means for introducing the substance into said filling space and onto said bottom element, from where the substance passes through the perforated bottom element from the filling space into the forming space.

The apparatus of the present invention may further preferably comprise means for elastically supporting at least said one of said elements, and said vibrating means may include a vibratory drive connected to said one of said elements.

In one currently preferred apparatus of the present invention, the container and bottom elements are rigid with one another, and the supporting means includes a support frame, and a plurality of elastic damper bodies suspending said container element from said support frame. The container element of this modification has an open upper end, and the apparatus comprises a stationary transverse member extending upwardly of and across said open upper end of said container element, said vibratory drive being mounted on said transverse member. In this modification, there may be further provided means for limiting said one of said elements to movement only along a substantially horizontal plane, such as lugs penetrating in between said elastic damper bodies.

As an alternative, the supporting means may include eccentric supports mounting said bottom element on said container element. Then, said vibratory drive is located at the exterior of said container element, and said vibrating means further includes at least one link connecting said vibratory drive to said bottom element.

The bottom element may include a mesh, particularly of metallic wires which is mounted on and spans a frame, or it may include a grating, especially constituted by a plurality of bars which bound the above-mentioned perforations. Preferably, at least some of the perforations of the bottom element are elongated.

In an embodiment of the present invention which is particularly useful in producing profiled articles or preforms therefor, the bottom element has at least one region deviating from a general plane of the bottom element, and then the bottom element has a side wall portion at such region. Such region may have surfaces which are inclined relative to such general plane, and the side wall portion may be provided only at such surfaces.

A very advantageous embodiment of the present invention is obtained when said bottom element includes two perforated members which are mounted for relative movement at a small distance from one another along a common plane, the vibrating means including at least one vibratory drive, and means for so connecting such vibratory drive to at least one of said members that the latter conducts vibratory movement relative to the other member during the energization of the vibratory drive. Preferably, the apparatus then further comprises means for so connecting the vibrating means also to the other member that the two members conduct independent vibratory movements with respect to one another during the energization of the vibrating means.

A first of the members is interposed between a second of the members and said mold element. Then, the perforations of the second member may be spaced from one another by spacings which are greater than the distances between the perforations of the first member. The spacings may be between two and six times greater than the distances which, in turn, may be rather small. In the arrangement of the present invention wherein a first of the members is interposed between a second of the members and the mold element, the vibrating means may include at least one vibratory drive, and means for so connecting the vibratory drive to the first and second members that the former conducts linear vibratory movements while the latter conducts vibratory translations along a substantially circular trajectory. The first member may perform 20 to 100 strokes per minute, while the second member may perform 200 to 1000 vibratory translations per minute.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a vertical section of the apparatus of the present invention prior to the filling of a forming space with the substance;

FIG. 2 is a view similar to FIG. 1 but subsequent to the filling of the forming space with the substance;

FIG. 3 is a view similar to FIG. 1 but of a modified apparatus;

FIG. 4 is a top plan view of the apparatus of FIG. 3;

FIG. 7*a* is a view similar to FIG. 5*a* but of still another final article;

FIG. 7*b* is a view similar to FIG. 5*b* but for making the preform for the final article of FIG. 7*a;*

FIG. 8*a* is a view similar to FIG. 5*a* but of a corrugated final article;

FIG. 8*b* is a view similar to FIG. 5*b* but illustrating the arrangement for making the preform for the corrugated final article of FIG. 8*a;*

DETAILED DISCUSSION OF THE PREFERRED EMBODIMENTS

Figure 5A:
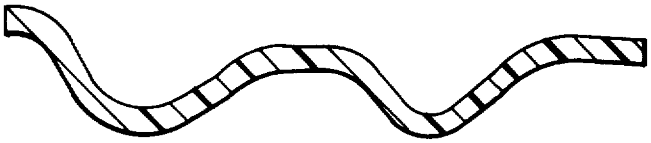
FIG. 5a is a cross-sectional view of one final article of profiled configuration for which the preform can be made in the apparatus of FIGS. 1 to 4.

Referring now to the drawings in general, and first to FIGS. 1 to 4, it is to be mentioned that the apparatus illustrated in these Figures is to be capable of performing the following tasks:

This apparatus should be capable of filling a precisely metered amount of a non-flowable, such as fibrous, substance into a cavity of a lower mold, and of repeating the filling as often as needed for making a series of preforms, in such a manner that the substance made into a preform can be pressed into a final article with straight or corrugated, for instance, undulated or pronouncedly profiled configuration and/or of different densities in different regions of the final article.

It is also required of the apparatus to render it possible to distribute the substance in any desired manner, that is, also irregularly, in the mold.

The apparatus should also make it possible to automatically terminate the filling operation upon filling of the substance into the mold.

The apparatus should be of such construction as to be capable of being brought in a simple manner toward the mold, removed from the mold, and otherwise operated.

In the embodiment of the present invention illustrated in FIGS. 1 and 2, the apparatus of the present invention includes a box-shaped container member 1 which is so configurated as to be capable of alignment with a lower mold 2. A bottom element 3 is connected to the lower end of the container 1, the bottom element 3 being provided with a plurality of openings or perforations. Preferably, the bottom element 3 is a sieve. The container 1 is elastically suspended, which is achieved, in this embodiment, by means of damping bodies 4, such as of natural or synthetic rubber in which there are embedded metallic connecting aids, the damping bodies 4 supporting the container 1 on a frame 11.

The container 1 has an open upper end, and a transverse member or bracket 12 extends across the open upper end of the container 1, a vibratory drive 5 being supported on the bracket 12. The vibratory drive 5 preferably swings the container 1 along a horizontal plane, and the vibratory or swinging motion may be a translation along a circular, elliptical or otherwise shaped trajectory.

When it is desired to assure that the swinging or vibratory motion is to take place exclusively along the horizontal plane, it is advantageous, as illustrated in FIGS. 1 and 2, to limit the container 1 to such a movement by equipping the container 1 with lugs 9 which are guided between bearing blocks 10. However, the swinging motion can be achieved, when necessary, in another way. So, for instance, it can be advantageous, under certain circumstances, to perform a vibratory motion in the vertical direction subsequent to the vibratory motion along the horizontal plane. To achieve this purpose, the vibratory drive 5 can be mounted, as illustrated in FIGS. 1 and 2, on the container 1 or, alternatively, next to the apparatus.

In the embodiment of the present invention illustrated in FIGS. 1 and 2, the lower mold 2 has such a configuration as to be capable of making a preform, or producing a final article, with a reinforced margin, such as a table top. The bottom of the lower mold 2 is so formed in two parts that one of the parts is movable relative to the other part in the vertical direction. As illustrated in FIG. 1, the container 1 is filled with a non-flowable mixture or substance, wherein the filling is performed either manually from a measuring receptacle, or automatically from a storage vessel, in a metered amount. The apparatus may further include an upper mold which, however, is not illustrated in FIGS. 1 and 2. The reason for this is that the upper mold has no special features which would be of importance in connection with the present invention. It is to be mentioned, however, that the upper mold which is moved against the lower mold 2 after the filling of the lower mold 2 with the pourable substance, as will be discussed presently, has a planar surface at the region thereof which will come into contact with the pourable substance in the lower mold 2.

When the vibratory drive 5 is energized, the non-flowable but pourable mixture or substance present in the container 1 trickles or passes through the perforated bottom element 3 and into the cavity of the lower mold 2, until the forming space defined from below by the lower mold 2 and from above by the bottom element 3 of the container 1 is filled with the pourable mixture. During the filling of the forming space additional amounts of the pourable substance enter into those regions of the forming space from which the pourable substance is still absent, until the filling of the forming space is uniform and complete. Even when the operation of the vibratory drive 5 is not terminated immediately following the complete filling of the forming space, no further mixture or substance can enter the forming space. Thus, the exact metering of the amount of the mixture or substance is automatic.

The apparatus of the present invention achieves the advantage that, on the one hand, the needed amount of the mixture or substance is absolutely automatically filled into the forming space and, on the other hand, the desired distribution of the mixture or substance is also achieved absolutely automatically as a result of the fact that the configuration of the bottom element 3 is accommodated to the desired shape and/or density of the preform and of the final article, in addition to the proper shaping of the surfaces of the lower mold 2 which bound the forming space from below.

The novel apparatus can be used, to advantage, either for metered filling of the substance into a precompressing lower mold in which the preform is first made and then, in a subsequent operation, the preform is shaped to the final configuration of the article being produced, by hot pressing, or in a hot pressing mold in which the article is compressed in a single operation.

A further advantage is achieved with the embodiment of the present invention which is illustrated in FIGS. 3 and 4, which differentiates from the above-discussed embodiment by the fact that the sieve-shaped bottom element 3 consists of a grating 8 constituted by a plurality of parallel rods or slots 7. When the bottom element 3 is configurated in this manner, the substance is not only automatically poured into and distributed in the forming spaced in a metered quantity, but also the, for example, filament-shaped particles of the substance are automatically preferentially oriented in the directions of the rods or slots 7. In many applications, only the preferential orientation of the substance from which the final article is produced, gives the latter the needed mechanical strength. This is particularly true when the particles contain or consist of cellulose or ligna cellulose.

In addition thereto, the embodiment illustrated in FIGS. 3 and 4 of the apparatus of the present invention differs from the above-discussed embodiment in that the container 1 is so constructed as to be fittingly assemblable with the lower mold 2, and the bottom element 3 is mounted on the container 1 by means of eccentric bearings 14. In this embodiment of the present invention, the vibratory drive 5 is located to the outside of the container 1. The vibrations generated by the vibratory drive 5 are transmitted to the sieve-shaped bottom element 3 by means of conventional links and levers.

Having so discussed the construction of the apparatus of the present invention, attention will now be directed to FIGS. 5*a* to 8*b* in which it is illustrated that the novel apparatus is capable of filling forming spaces with the pourable substance preparatory to the production of profiled bodies or articles of various configurations.

So, for instance, FIGS. 5*a* illustrates, in vertical section, an already finally pressed profiled article which is heavily corrugated, that is, strongly uneven. However, the article illustrated in FIG. 5*a* has a substantially uniform wall thickness and, when finally compressed, a uniform density.

Figure 5B:
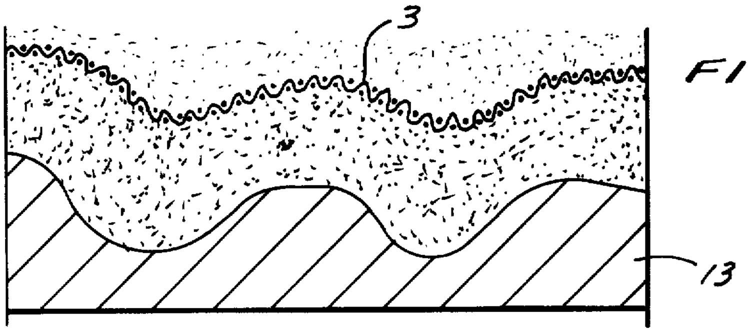
FIG. 5*b* is a partial sectional view similar to FIG. 2 for making the preform for the final article of FIG. 5*a;*

A precisely metered and distributed preform of the substance, which is needed for the production of such a profiled article, can be obtained by resorting to the use of the novel apparatus in such a manner that the sieve-shaped bottom element 3 has the shape which is evident from FIG. 5*b*. In order to be able to produce the final article of FIG. 5*a*, it is necessary that the upper surface of the lower mold, here designated with the reference numeral 13, and the lower surface of the upper mold, which is not illustrated in FIG. 5*b*, be configurated in a similar manner to that of the bottom element 3.

Figure 6A:
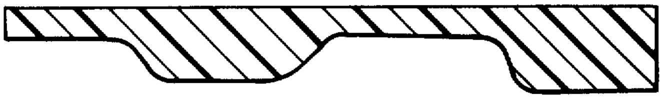
FIG. 6*a* is a view similar to FIG. 5*a* but of another profiled final article.

FIG. 6*a* illustrates, in a longitudinal section, another already finally pressed profiled body or article of a different configuration from that of FIG. 5*a*, the upper surface of this body being planar and the lower surface of which is formed with rib-shaped reinforcing portions extending into the plane of the drawing.

Figure 6B:
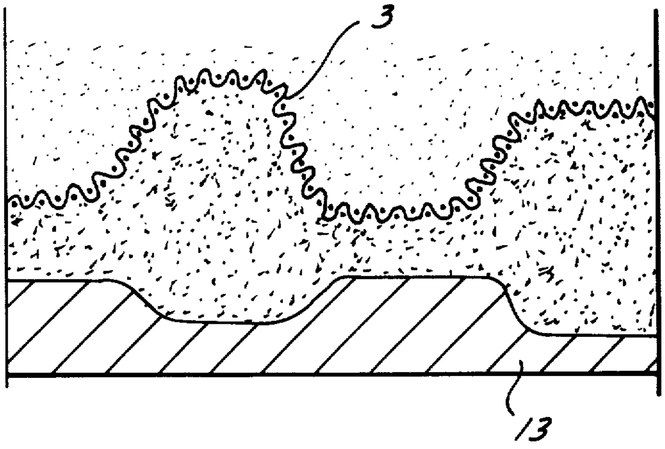
FIG. 6*b* is a view similar to FIG. 5*b* but for making a preform for the final article of FIG. 6*a;*

The preform for the production of such a profiled body from the substance or mixture can also be made by resorting to the use of the novel apparatus in that the sieve-shaped bottom element 3 has the shape illustrated in FIG. 6*b*. It is to be also mentioned that the profiled article according to FIG. 6*a* should also have a uniform density throughout. After the forming of the preform, in the lower mold 13, the preform is compressed by means of a non-illustrated upper mold which has a planar lower surface, against the lower mold 13 having the configuration which is recognizable from FIG. 6*b*.

FIG. 7*a* shows, in a longitudinal sectional view, a further already finally pressed profiled body or article which is fully even and plank-shaped which, however, in its final state, should have different densities in various regions thereof. This is indicated in FIG. 7*a* in such a manner that the middle region of the finished article, in which the article has a higher density, has a more congested hatching.

In order to provide the preform which is needed for the production of this profiled article, the sieve-shaped bottom element 3 is configurated in the manner illustrated in FIG. 7*b*. In this arrangement, the lower mold 13, as well as the non-illustrated upper mold, have planar surfaces.

A still another profiled article in its final form is illustrated in FIG. 8*a*. This is, for instance, as illustrated in section, an even plate which is, in the central portion thereof, provided with a channel-shaped depression. What is characteristic for this profiled article is that the article has a smaller thickness in its even region than in the region of the depression.

For producing the preform of the above-mentioned substance for the production of this profiled body, the sieve-shaped bottom element 3 is planar as illustrated in FIG. 8*b*. Then, the lower mold 13 and the non-illustrated upper mold are formed with corresponding depressions or projections.

The above explanations have illustrated that the new apparatus brings about considerable advantages in mass production of pressed profiled articles, inasmuch as it is capable of introducing the substance into the lower mold in the desired amont which is the same for all of the preforms of a series, and even in differently preselected distribution. In addition thereto, the apparatus of the present invention can be easily handled during the use thereof inasmuch as it can be assembled with the lower mold by simple means, for instance, by tilting, lateral displacement or lowering, and rapidly removed from its assembled condition subsequent to the termination of the filling of the lower mold. Also, the container can be replenished with the substance by known means, either on a continuous or on an intermittent basis.

The new apparatus thus brings about not only a significant simplification of the operation during the production of pressed profiled articles, but also results in a high and uniform quality.

Figure 9:
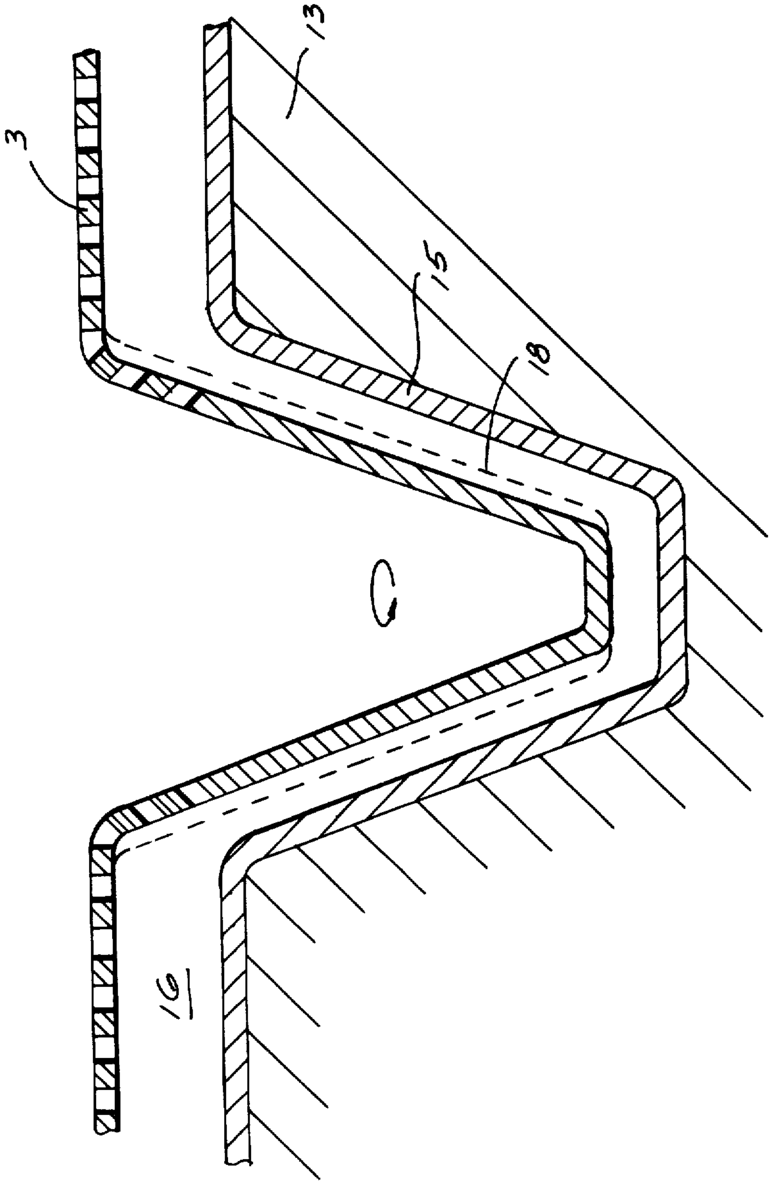
FIG. 9 is a partial vertical sectional view for making a preform for a pellet, taken in the region of the pellet leg.
Figure 10:
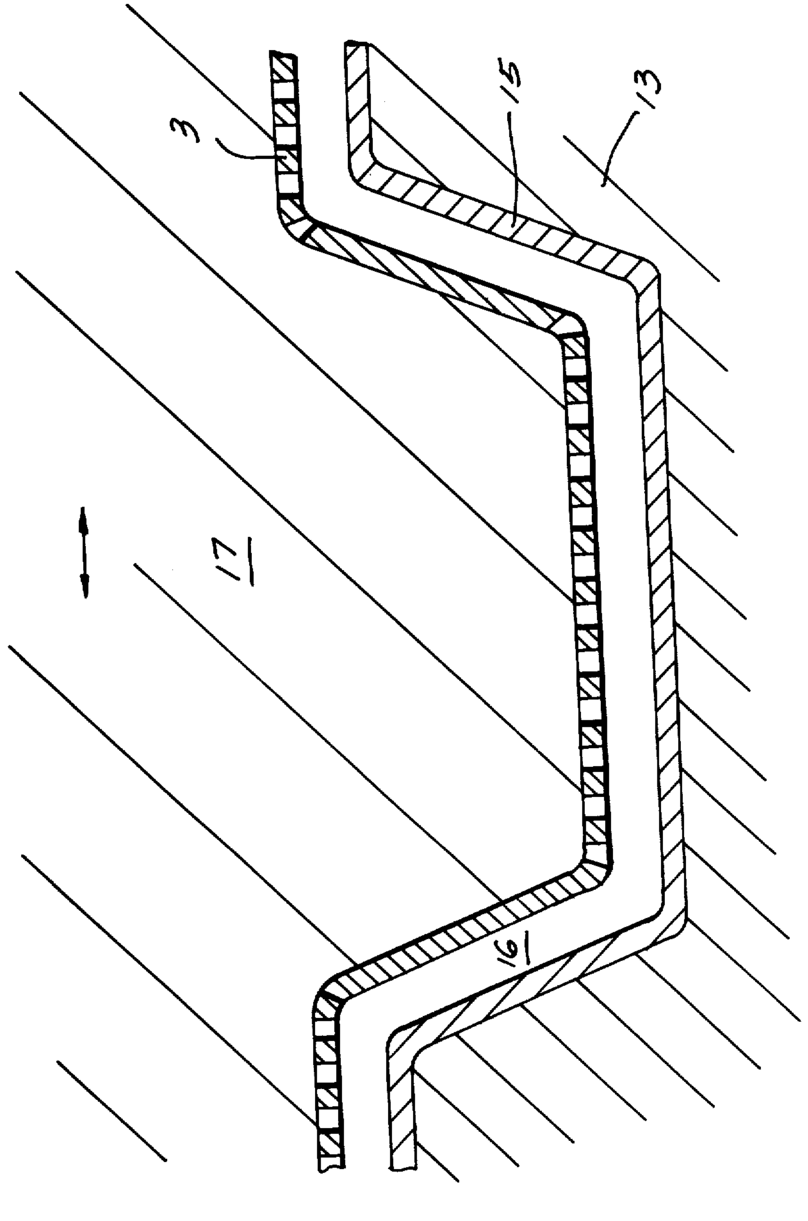
FIG. 10 is a view similar to FIG. 9 but as utilized in making a preform for a concrete casting body, taken in the region in which the body has a deep recess.

Referring now to FIGS. 9 and 10, it may be seen that they illustrate modified embodiments of the apparatus of the present invention which are capable of performing the method of the present invention for making preforms for profiled articles from a non-flowable but pourable substance, which articles have a substantially uniform wall thickness and very steep wall portions.

In FIG. 9, the reference numeral 13 indicates the lower mold in which the preform of uniform thickness is to be formed. The article which is produced from the preform then has the thickness which is illustrated by the layer 15. The shape of the article to be pressed is machined into the lower mold 13. Similarly, the sieve-shaped bottom 3 has a configuration corresponding to that of the article to be produced. The bottom element 3 is arranged at such a distance from the lower mold 13, which corresponds to the thickness of the preform to be made. As known, the thickness of the preform amounts to four to seven times the thickness of the final profiled article.

Prior to the making of the preform, that is, prior to the filling of a forming space 16 between the lower mold 13 and the sieve-shaped bottom element 3, a filling space 17 upwardly of the bottom element 3 is filled with the substance. As a result of vibration of the sieve-shaped bottom element 3 which is yieldably suspended for horizontal oscillation, the substance falls through the perforations of the bottom element 3 and fills the forming space 16.

As can be also ascertained from FIG. 9, the sieve-shaped bottom element 3 is constructed as a solid wall in those regions in which the preform is to have a very steep slope, that is, at the flanks and at the bottom of a pellet leg of a pellet to be produced. In addition thereto, the sieve-shaped bottom element 3, as illustrated by an arrow, conducts horizontal orbiting movement during the filling and/or after the filling of the forming space 16 with the substance, with such an amplitude that the preform is already compacted or densified to some extent, at least in the regions of the steep flanks. After this operation, the preform still has a thickness which is two to four times greater than the thickness of the final article. The horizontal displacement, which the sieve-shaped bottom element 3 performs during the compacting operation, is indicated by a dashed line 18.

This compacting by the sieve-shaped bottom element 3 rigidifies the preform to such an extent that the preform will retain its uniform thickness and thus form a uniform layer even in the steep regions, even after the removal of the sieve-shaped bottom element 3, so that the preform can be further treated subsequent to the removal of the bottom element 3 either by cold pre-pressing or even by an immediately following hot pressing.

The embodiment illustrated in FIG. 10 differs from the embodiment described above in connection with FIG. 9 only by the fact that the final article to be produced, for which a preform is to be made, does not include any relatively narrow, round depressions (such as the above-discussed pellet legs), but rather includes elongated depressions having relatively large width. Under these circumstances, in order to be able to fill the forming space 16 in a reliable manner and in a not excessively long time period, with the substance, the sieve-shaped bottom element 3 has solid walls only in the regions of the flanks and is again perforated at the bottom of the depression. In addition thereto, it is intended for the sieve-shaped bottom element 3 of this embodiment to conduct only horizontal straight-line movement as indicated by an arrow. In all other respects, the same effect is obtained as that discussed in connection with the embodiment of FIG. 9, in the foregoing passages.

As a result of the above-discussed expedients, preforms can be made in accordance with the above-discussed method from a chip or fibrous substance which is intermixed with a binder, which preforms can then be further treated in order to obtain compressed profiled articles which possess a uniform wall thickness even in the region of steep, almost perpendicularly extending regions.

While the above-discussed apparatus is very advantageous for most applications, experience therewith has shown that, particularly when the articles produced by such an apparatus are to be of very high quality, the above-discussed apparatus is still possessed of some drawbacks.

So, for instance, the sieve-shaped bottom element 3, depending on the time period for which it acts on the preform, can produce on the upper surface of the preform a pattern which corresponds to the perforated shape of the sieve-shaped bottom element 3, which pattern is then also recognizable on the surface of the finally pressed profiled article. This, however, is undesirable under some circumstances and in connection with some compressed articles.

Another drawback is to be seen in the fact that the substance to be shaped into the preform can become de-mixed during the operation of the sieve-shaped bottom element 3. The reason for this phenomenon is to be found in the fact that the oscillations or vibrations of the vibrating bottom element 3 are transmitted to the preform being formed or to the already formed preform, as a result of which the particles of the mixture which constitutes the substance are de-mixed from one another. This is attributable to the fact that the finer particles of the preform fall downwardly between the coarser particles during the vibration and, as a result of that, the coarse particles remain, almost to the exclusion of the fine particles, at the upper surface of the preform, exactly where it would be desirable to have, preferentially, the finer particles. These drawbacks, which are not important under most circumstances, but which are quite important under other circumstances, are avoided by the apparatus which is constructed in accordance with FIG. 11.

Figure 11:
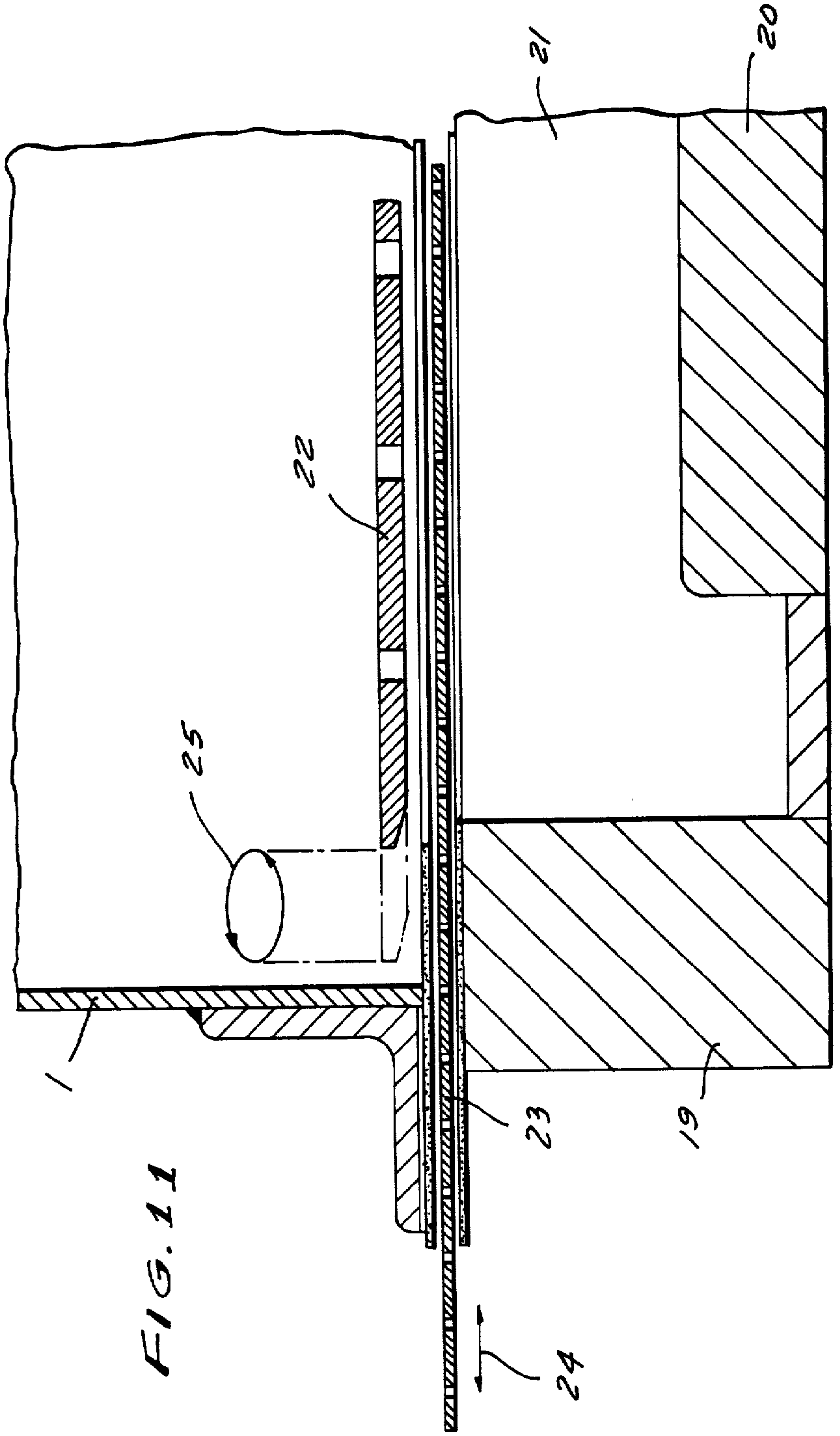
FIG. 11 is a partial vertical cross-sectional view similar to FIGS. 1 to 3 but illustrating a special construction of a bottom of a container.

As illustrated in FIG. 11, the lower mold consists of a lateral wall 19 and a bottom wall 20, these walls 19 and 20 bounding a forming space 21 which is to be filled with a predetermined amount of the substance. During the filling operation, the box-shaped container 1 is placed over the lower mold 19, 20, the bottom element of the container 1 being constituted by two sieve-shaped bottom members 22 and 23. The bottom members 22 and 23 delimit the forming space 21 from above in the assembled condition of the container 1 with the lower mold 19, 20. These two sieve-shaped bottom members 22 and 23 are so connected with a non-illustrated conventional vibratory drive that each of the bottom members 22 and 23 conducts a vibratory movement in horizontal direction, relative to the container 1 and also relative to the other bottom member 23 or 22. In the illustrated embodiment of the present invention, the lower sieve-shaped bottom member 23 conducts a linear movement, as indicated by arrows 24. On the other hand, the upper sieve-shaped bottom wall 22 conducts a translatory motion along a circular trajectory, as indicated by the elliptical arrow 25.

When the forming space 21 of the lower mold 19, 20 is to be filled with the substance or mixture, the filling space which is provided in the box-shaped container 1 is first filled with the substance which is admitted into such filling space either intermittently by means of a filling receptacle or continuously by means of a slide or the like. The filling of the forming space 21 of the lower mold 19, 20 follows the assembly of the container 1 with the lower mold 19, 20 in such a manner that the bottom members 22 and 23 are set into motion. Now, the substance falls through the sieve-shaped bottom members 22 and 23 for so long until the forming space 21 is filled with the substance, without the de-mixing effect of the substance being encountered. Even when the movement of the sieve-shaped bottom members 22 and 23 continues after the forming space 21 has been already filled with the substance, no further substance can enter the forming space 21 of the lower mold 19, 20.

The new apparatus can be constructed even so that a profiled article with an especially flat and smooth upper surface can be produced from the substance filled into the forming space 21 of the lower mold 19, 20. This result is obtained when the lower sieve-shaped bottom member 23 has a relatively small spacing between each two of the perforations thereof, while the upper sieve-shaped bottom member 22 has its perforations located at distances which are two to six times greater than the spacings of the perforations of the lower sieve-shaped bottom member 23, and particularly when the two sieve-shaped bottom members 22 and 23 are vibrated at different speeds.

When the apparatus of the present invention is constructed in such a manner, only fine particles of the substance penetrate through the sieve-shaped bottom members 22 and 23 toward the end of the filling operation so that the preform and, consequently, also the final article, obtain a smooth upper surface.

In each event, the lower sieve-shaped bottom member 23 has perforations of such dimensions that even the coarsest particles of the substance can penetrate therethrough. When the substance is a mixture of fibers and a heat-hardening binder, the dimensions of the perforations of the lower sieve-shaped bottom member 23 amount to, for instance, six to ten millimeters. When such substances are being treated, profiled articles having especially smooth upper surfaces are produced when the lower sieve-shaped bottom member 23 conducts 20 to 100 strokes per minute, while the upper sieve-shaped bottom member 22 conducts 200 to 1000 circular transitory movements per minute.

With the novel apparatus, uniform fillings are always obtained of the forming spaces of lower molds with out running the danger of de-mixing, and the articles produced in this manner have a finely particulate upper surface without impressions of the sieve pattern therein. In addition thereto, the apparatus is very easy to handle, which is of a particular prominence in series production of the preforms and of the final articles.

It will be understood that each of the elements described above, or two or more together, may also find a useful application in other types of constructions differing from the types described above.

While the invention has been illustrated and described as embodied in a method of and an apparatus for making preforms for subsequent use in producing profiled articles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for making preforms from a pourable but at most limitedly flowable substance for subsequent use in producing three-dimensional articles, comprising a mold element having a cavity and an open top; a container element for accommodating a substance, located above said mold element and having a shaped perforated screen arranged on the container element defining a substantially closed forming space between said screen and the mold cavity; and means for vibrating said container element relative to the mold element so that the substance advances through perforations of said screen of said container element into the cavity of the mold element and distributes substantially uniformly in the cavity.

2. An apparatus as defined in claim 1; wherein said container element and screen bound a filling space with one another; and providing admitting means wherein said admitting means includes means for introducing the substance into said filling space and onto said screen.

3. An apparatus as defined in claim 1, wherein at least some of the perforations of said screen are elongated.

4. An apparatus as defined in claim 1; and further comprising means for elastically supporting said container element; and wherein said vibrating means includes a vibratory drive connected to said container element.

5. An apparatus as defined in claim 4, wherein said supporting means includes eccentric supports mounting said screen on said container element; wherein said vibratory drive is located at the exterior of said container element; and wherein said vibrating means further includes at least one link connecting said vibratory drive to said screen.

6. An apparatus as defined in claim 4, wherein said container and screen are rigid with one another; and wherein said supporting means includes a support frame, and a plurality of elastic damper bodies suspending said container element from said support frame.

7. An apparatus as defined in claim 6, wherein said container element has an open upper end; further comprising a stationary transverse member extending upwardly of and across said open upper end of said container element; and wherein said vibratory drive is mounted on said transverse member.

8. An apparatus as defined in claim 4; and further comprising means for limiting said container element to movement only along a substantially horizontal plane.

9. An apparatus as defined in claim 8, wherein said limiting means includes lugs penetrating in between said elastically supporting means.

10. An apparatus as defined in claim 1, wherein said screen includes a frame, and a mesh spanningly mounted on said frame.

11. An apparatus as defined in claim 10, wherein said mesh is constituted by a plurality of metallic wires.

12. An apparatus as defined in claim 1, wherein said screen includes a grating bounding said perforations.

13. An apparatus as defined in claim 12, wherein said grating is constituted by a plurality of bars.

14. An apparatus as defined in claim 1, wherein said screen has at least one region deviating from a general plane of said screen; and wherein said screen has a solid wall portion at said region.

15. An apparatus as defined in claim 14, wherein said region has surfaces which are inclined relative to said general plane; and wherein said solid wall portion is provided only at said surfaces.

16. An apparatus as defined in claim 1, wherein said screen includes two perforated members; further comprising means for mounting said members for relative movement at a small distance from one another along a common plane; and wherein said vibrating means includes at least one vibratory drive, and means for so connecting said vibratory drive to at least one of said members that the latter conducts vibratory movement relative to the other member during the energization of said vibratory drive.

17. An apparatus as defined in claim 16; and further comprising means for so connecting said vibrating means also to said other member that said member conduct independent vibratory movements with respect to one another during the energization of said vibrating means.

18. An apparatus as defined in claim 16, wherein a first of said members is interposed between a second of said members and said mold element; and wherein the perforations of said second member are spaced from one another by spacings which are greater than the distances between the perforations of said first member.

19. An apparatus as defined in claim 18, wherein said distances are small; and wherein said spacings are between two and six times greater than said distances.

20. An apparatus as defined in claim 16, wherein a first of said members is interposed between a second of said members and said mold element; and wherein said vibrating means includes at least one vibratory drive, and means for so connecting said vibratory drive to said first and second members that the former conducts linear vibratory movements while the latter conducts vibratory translations along a substantially circular trajectory.

21. An apparatus as defined in claim 20, wherein said first member performs 20 to 100 strokes per minute.

22. An apparatus as defined in claim 20, wherein said second member performs 200 to 1000 vibratory translations per minute.

* * * * *